US009960445B2

(12) United States Patent
Bard et al.

(10) Patent No.: US 9,960,445 B2
(45) Date of Patent: May 1, 2018

(54) REDOX FLOW BATTERY THAT USES COMPLEXES OF COBALT AND IRON WITH AMINO-ALCOHOL LIGANDS IN ALKALINE ELECTROLYTES TO STORE ELECTRICAL ENERGY

(71) Applicant: Board of Regents, The University of Texas System, Austin, TX (US)

(72) Inventors: Allen J. Bard, Austin, TX (US); Netzahualcoyotl Arroyo, Santa Barbara, CA (US)

(73) Assignee: Board of Regents, The University of Texas System, Austin, TX (US)

( * ) Notice: Subject to any disclaimer, the term of this patent is extended or adjusted under 35 U.S.C. 154(b) by 151 days.

(21) Appl. No.: 14/912,561

(22) PCT Filed: Oct. 7, 2014

(86) PCT No.: PCT/US2014/059504
§ 371 (c)(1),
(2) Date: Feb. 17, 2016

(87) PCT Pub. No.: WO2015/054260
PCT Pub. Date: Apr. 16, 2015

(65) Prior Publication Data
US 2016/0204460 A1 Jul. 14, 2016

Related U.S. Application Data

(60) Provisional application No. 61/887,546, filed on Oct. 7, 2013.

(51) Int. Cl.
*H02J 7/00* (2006.01)
*H02J 7/14* (2006.01)
(Continued)

(52) U.S. Cl.
CPC ............. *H01M 8/188* (2013.01); *H01M 4/38* (2013.01); *H01M 4/60* (2013.01); *H01M 8/083* (2013.01);
(Continued)

(58) Field of Classification Search
USPC ....... 429/105, 107, 499, 108, 451, 101, 106, 429/109, 324, 338, 452, 50, 51; 320/127,
(Continued)

(56) References Cited

U.S. PATENT DOCUMENTS

2005/0164075 A1* 7/2005 Kumamoto ....... H01M 8/04186
429/50
2011/0189549 A1 8/2011 Sun et al.
(Continued)

FOREIGN PATENT DOCUMENTS

| WO | 2012038379 A1 | 3/2012 |
|---|---|---|
| WO | 2012162383 A1 | 11/2012 |

OTHER PUBLICATIONS

International Preliminary Report on Patentability for International Application No. PCT/US2014/059504 dated Apr. 12, 2016, pp. 1-11.
(Continued)

*Primary Examiner* — Alexis Pacheco
(74) *Attorney, Agent, or Firm* — Robert A. Voigt, Jr.; Winstead, P.C.

(57) ABSTRACT

A redox flow battery that uses metal complexes with amino-alcohol ligands as the electroactive species in alkaline electrolytes to store electrical energy. The battery includes a first and a second electrolyte storage unit that each includes a metal complex selected from transition metals with an amino-alcohol ligand as an electroactive species in an alkaline electrolyte. Such solutions in these electrolyte storage units are each prepared by mixing stoichiometric amounts of
(Continued)

a metal ion and an amino-alcohol ligand in water to form a metal-ligand mixture followed by adding an amount corresponding to 3-5 moles/liter of an alkaline electrolyte solution to each metal-ligand mixture to form a metal complex with the amino-alcohol ligand in the alkaline electrolyte to be used by a storage unit. As a result, the operational and maintenance costs of the redox flow battery are reduced while reducing the complexity of the manufacturing process.

14 Claims, 9 Drawing Sheets

(51) Int. Cl.
*H01M 8/18* (2006.01)
*H01M 4/38* (2006.01)
*H01M 4/60* (2006.01)
*H01M 8/083* (2016.01)
*H01M 8/20* (2006.01)
*H01M 8/08* (2016.01)
*H01M 6/16* (2006.01)

(52) U.S. Cl.
CPC ............... *H01M 8/20* (2013.01); *H02J 7/00* (2013.01); *H02J 7/0068* (2013.01); *H01M 6/16* (2013.01); *H01M 8/08* (2013.01); *Y02E 60/528* (2013.01)

(58) Field of Classification Search
USPC .................................................. 320/137, 128
See application file for complete search history.

(56) References Cited

U.S. PATENT DOCUMENTS

| | | | |
|---|---|---|---|
| 2014/0004403 A1* | 1/2014 | Yan ..................... | H01M 8/20 429/107 |
| 2014/0028260 A1* | 1/2014 | Goeltz ................ | H01M 8/188 320/127 |
| 2014/0051003 A1* | 2/2014 | Esswein .............. | H01M 8/20 429/452 |

OTHER PUBLICATIONS

International Search Report and Written Opinion for International Application No. PCT/US2014/059504 dated Jan. 13, 2015, pp. 1-12.
Bard et al., "Novel Redox Flow Batteries," GCEP Research Symposium, Oct. 9, 2013, pp. 1-20.
Arroyo-Curras et al., "Co/Fe: The Alkaline Redox Flow Battery," Poster at GCEP Research Symposium, Oct. 9, 2013, one page.
Dunn et al., "Electrical Energy Storage for the Grid: A Battery of Choices," Science, vol. 334, Nov. 18, 2011, pp. 928-935.
Wang et al., "Recent Progress in Redox Flow Battery Research and Development," Advanced Functional Materials, vol. 23, 2013, pp. 970-986.
Nguyen et al., "Flow Batteries," The Electrochemical Society Interface, Fall 2010, pp. 54-56.
Kim et al., "Cycling Performance and Efficiency of Sulfonated Poly(Sulfone) Membranes in Vanadium Redox Flow Batteries," Electrochemistry Communications, vol. 12, 2010, pp. 1650-1653.

\* cited by examiner

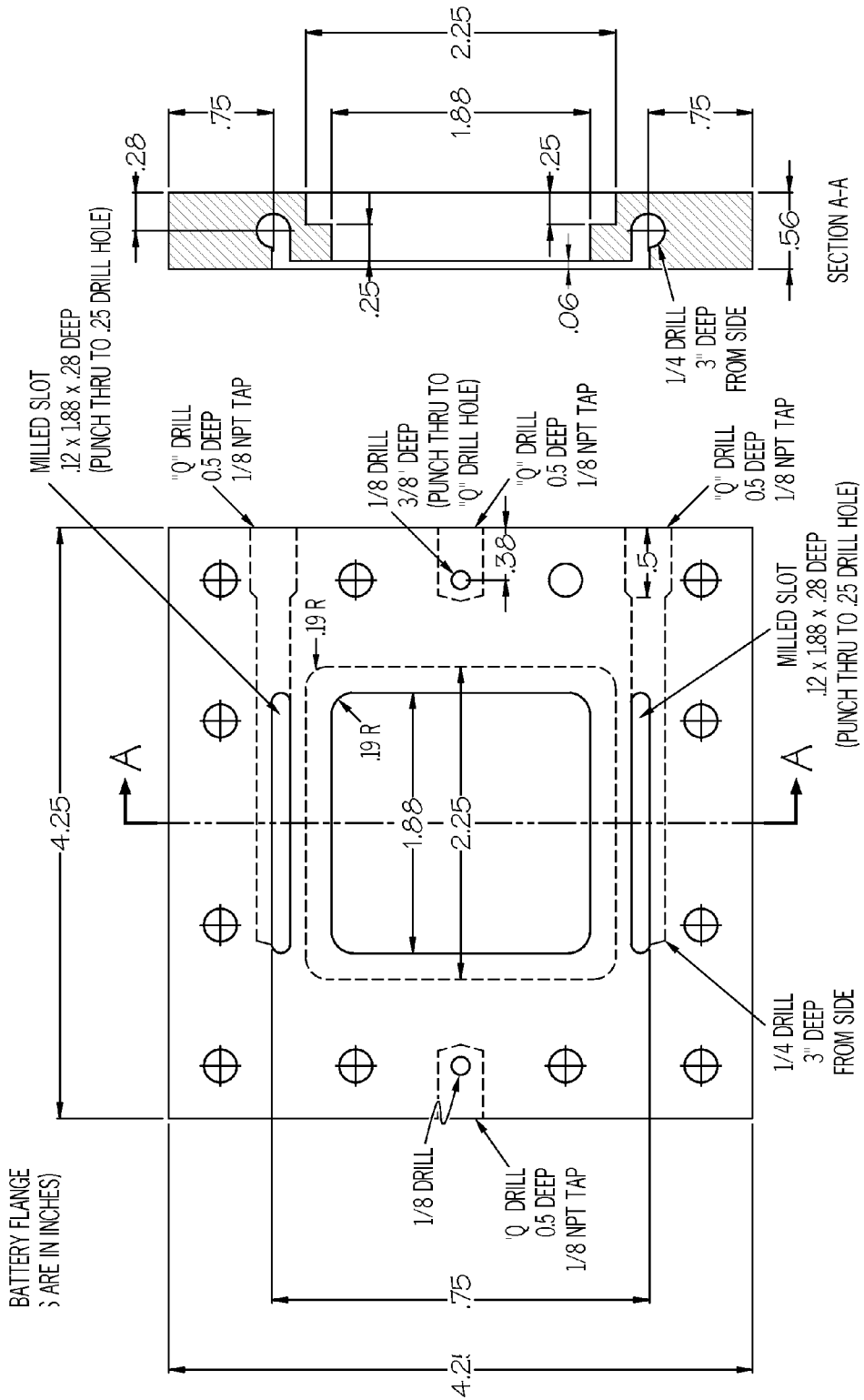

CURRENT COLLECTORS
(UNITS ARE IN INCHES)

REDOX FLOW BATTERY THAT USES COMPLEXES OF COBALT AND IRON WITH AMINO-ALCOHOL LIGANDS IN ALKALINE ELECTROLYTES TO STORE ELECTRICAL ENERGY

CROSS REFERENCE TO RELATED APPLICATIONS

This application claims priority to U.S. Provisional Patent Application Ser. No. 61/887,546, "A Redox Flow Battery that uses Complexes of Cobalt and Iron with Amino-Alcohol Ligands in Alkaline Electrolytes to Store Electrical Energy," filed Oct. 7, 2013, which is incorporated by reference herein in its entirety.

TECHNICAL FIELD

The present invention relates generally to redox flow batteries, and more particularly to a redox flow battery that uses complexes of cobalt and iron with amino-alcohol ligands in alkaline electrolytes to store electrical energy.

BACKGROUND

Renewable-energy sources, such as solar and wind, are being deployed in larger numbers than ever before, but these sources are intermittent and often unpredictable, and may provide energy only during the off-peak hours when power demand from consumers is low. These characteristics limit the extent to which utilities can rely upon them, and, as such, renewable energy sources currently comprise a small percentage of the primary power sources on the electrical grid. It has been suggested that the electrical grid could become destabilized if non-dispatchable renewable energy exceeds 20% of the energy-generation capacity without energy storage. However, many utilities are mandating renewable portfolios approaching this level of deployment. Thus, there is a pressing need for storage technologies to complement and enable renewable standards thereby providing renewable energy during peak demand. Furthermore, energy storage technologies are needed to provide demand response and other services to increase the reliability of the grid. Other than capacitors, however, there is no way to store electrical energy as such. Instead, if electricity is to be stored, it must first be converted to some other form of energy. There are some technologies that enable practical storage of energy at their current levels of deployment, but only a very small fraction of North American power plants employ such technology. To ensure that renewable energy succeeds in delivering reliable power to consumers, there needs to be cost effective and reliable storage at the grid scale.

Conventional rechargeable batteries offer a simple and efficient way to store electricity, but development to date has largely focused on transportation systems and smaller systems for portable power or intermittent backup power. These metrics relating to the size and volume are far less critical for grid storage than in portable or transportation applications. Batteries for large-scale grid storage require durability for large numbers of charge/discharge cycles as well as calendar life, high round-trip efficiency, an ability to respond rapidly to changes in load or input, and reasonable capital costs. Redox flow batteries or redox flow cells promise to meet many of these requirements.

A flow battery is a type of rechargeable battery where rechargeability is provided by two chemical components dissolved in liquids contained within the system and separated by a separator, for example, an ion-exchange membrane. A flow of ionic current occurs through the separator, while both liquids circulate in their own respective space. The energy storage capacity of the redox flow battery is fully decoupled from the available power, because the energy is related to the electrolyte volume, mass, and concentration (amount of liquid electrolyte) and the power to the number of cells included in the battery.

Currently, redox flow batteries are based on acidic electrolytes (e.g., hydrochloric and sulfuric acids). However, redox flow batteries based on acidic electrolytes suffer from considerable capacity fading due to species crossover and the occurrence of undesired secondary reactions during battery cycling (e.g. evolution of $Cl_2$ gas). Acidic electrolytes are reactive (corrosive) to the cell components, including the separator or ion-exchange membrane, which translates into high operational and maintenance costs. Furthermore, manufacturing the electrolyte for such redox flow batteries requires electrolysis and/or other preparation steps that increase the cost of production.

BRIEF SUMMARY

In one embodiment of the present invention, a redox flow battery comprises a first electrolyte storage, where the first electrolyte storage comprises a first metal complex selected from a first-row of transition metal ions with a first amino-alcohol ligand as an electroactive species in an alkaline electrolyte. The redox flow battery further comprises a second electrolyte storage, where the second electrolyte storage comprises a second metal complex selected from the first-row of transition metal ions with a second amino-alcohol ligand as an electroactive species in the alkaline electrolyte. The redox flow battery additionally comprises an electrochemical cell connected to the first and second electrolyte storages, where the electrochemical cell comprises a first half-cell and a second half-cell. The first half-cell comprises a first high surface area electrode functioning as an anode and the second half-cell comprises a second high surface area electrode functioning as a cathode, where the first and second half-cells are separated from each other by an ion exchange membrane. In addition, the redox flow battery comprises a first and a second pump for circulating the electrolytes in the first and second electrolyte storages, respectively, in the anode and the cathode, respectively.

In another embodiment of the present invention, a redox flow battery system comprises one or more power sources and a redox flow battery connected to the one or more power sources, optionally via an AC/DC converter, where the redox flow battery is configured to store electrical energy from the one or more power sources, optionally via the AC/DC converter. The redox flow battery comprises a first electrolyte storage, where the first electrolyte storage comprises a first metal complex selected from a first-row of transition metal ions with a first amino-alcohol ligand as an electroactive species in an alkaline electrolyte. The redox flow battery further comprises a second electrolyte storage, where the second electrolyte storage comprises a second metal complex selected from the first-row of transition metal ions with a second amino-alcohol ligand as an electroactive species in the alkaline electrolyte. The redox flow battery additionally comprises an electrochemical cell connected to the first and second electrolyte storages, where the electrochemical cell comprises a first half-cell and a second half-cell. The first half-cell comprises a first high surface area electrode functioning as an anode and the second half-cell comprises a second high surface area electrode functioning as a cathode, where the first and second half-cells are separated from each other by an ion exchange membrane. In addition, the redox flow battery comprises a first and a second pump for circulating the electrolytes in the first and second electrolyte storages, respectively, in the anode and the cathode, respectively.

In another embodiment of the present invention, a method for forming metal complexes with amino-alcohol ligands as electroactive species in alkaline electrolytes to store electrical energy into chemical energy in a redox flow battery comprises mixing stoichiometric amounts of a first metal ion and a first amino-alcohol ligand in water to form a first metal-ligand mixture. The method further comprises mixing stoichiometric amounts of a second metal ion and a second amino-alcohol ligand in water to form a second metal-ligand mixture. Furthermore, the method comprises pre-dissolving an alkaline electrolyte as pellets in water to form a solution. Additionally, the method comprises cooling the solution to room temperature. The method further comprises adding an amount corresponding to 3-5 moles/liter of the alkaline electrolyte from the solution to the first metal-ligand mixture to form a first metal complex with the first amino-alcohol ligand in the alkaline electrolyte. In addition, the method comprises adding an amount corresponding to 3-5 moles/liter of the alkaline electrolyte from the solution to the second metal-ligand mixture to form a second metal complex with the second amino-alcohol ligand in the alkaline electrolyte.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which:

FIG. 6A illustrates the redox flow battery flange in accordance with an embodiment of the present invention;

DETAILED DESCRIPTION

As stated in the Background section, a flow battery is a type of rechargeable battery where rechargeability is provided by two chemical components dissolved in liquids contained within the system and separated by a separator, for example, an ion-exchange membrane. A flow of ionic current occurs through the separator, while both liquids circulate in their own respective space. The energy storage capacity of the redox flow battery is fully decoupled from the available power, because the energy is related to the electrolyte volume, mass, and concentration (amount of liquid electrolyte) and the power to the number of cells included in the battery. Currently, redox flow batteries are based on acidic electrolytes (e.g., hydrochloric and sulfuric acids). However, redox flow batteries based on acidic electrolytes suffer from considerable capacity fading due to species crossover and the occurrence of undesired secondary reactions during battery cycling (e.g. evolution of $Cl_2$ gas). Acidic electrolytes are reactive (corrosive) to the cell components, including the separator or ion-exchange membrane, which translates into high operational and maintenance costs. Furthermore, manufacturing the electrolyte for such redox flow batteries requires electrolysis and/or other preparation steps that increase the cost of production. The present invention relates to the development of a redox flow battery based on an alkaline electrolyte that presents negligible crossover and gas-free storage of energy. The electrolyte is prepared in a one-step, straightforward process.

Figure 1:
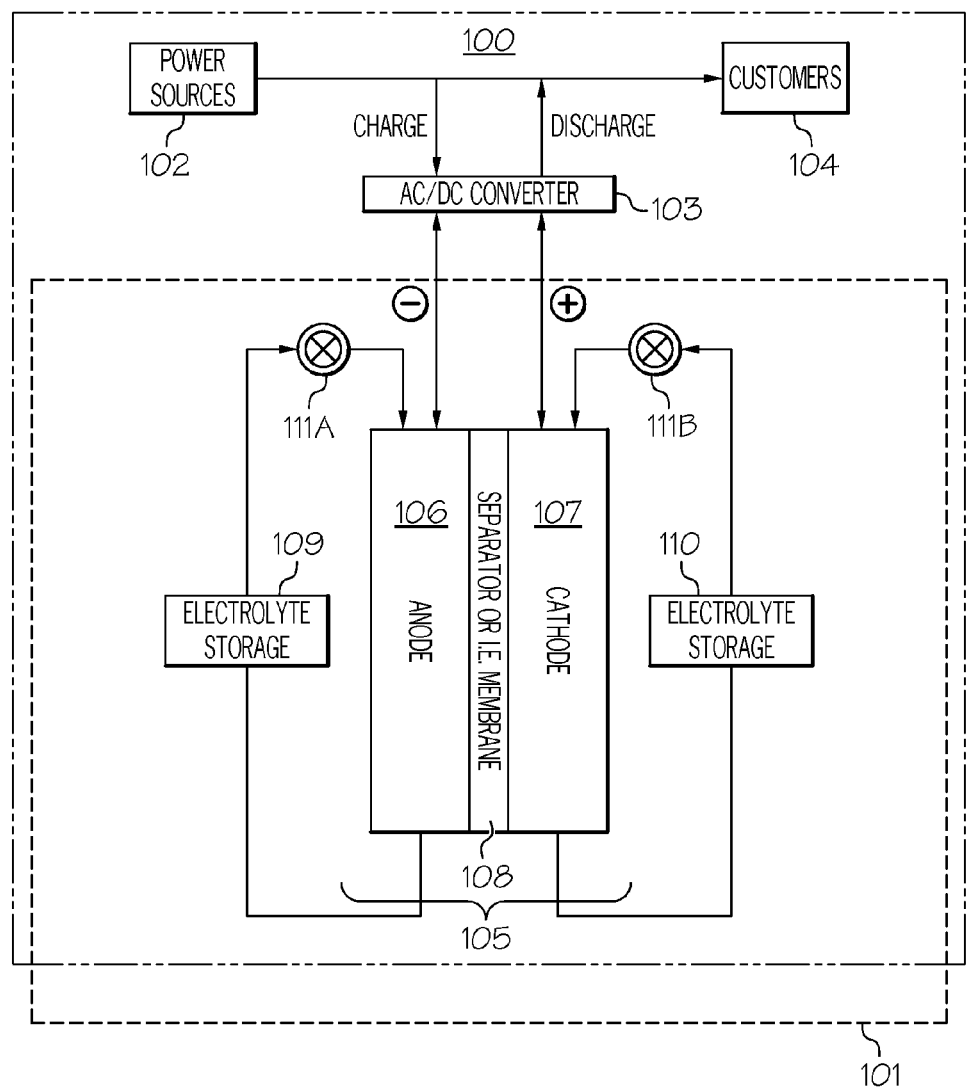
FIG. 1 illustrates a redox flow battery system incorporating a redox flow battery that uses complexes of cobalt and iron with amino-alcohol ligands as the electroactive species in alkaline electrolytes for storing electrical energy in accordance with an embodiment of the present invention.
Figure 2:
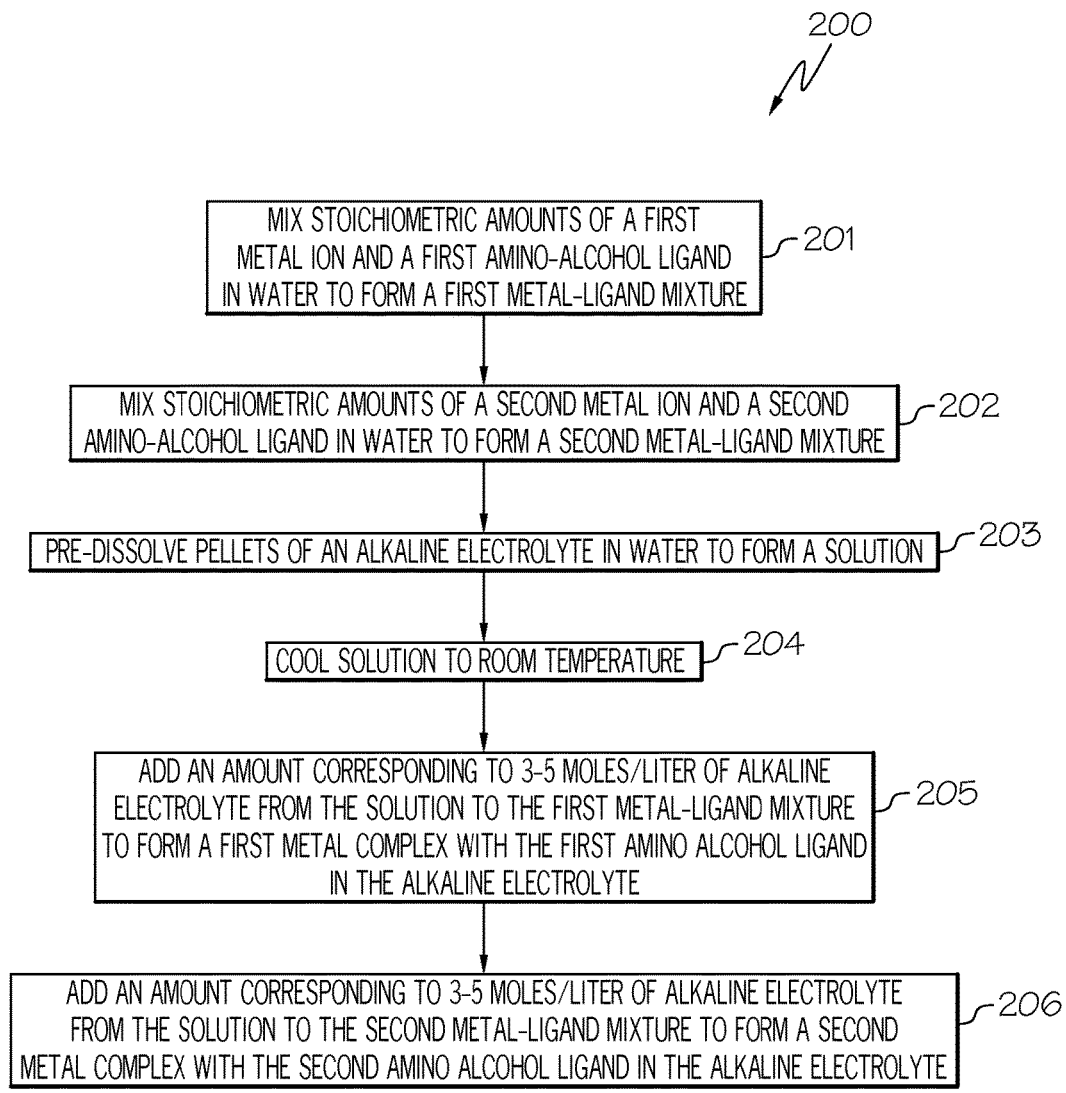
FIG. 2 is a flowchart of a method for forming the complexes of cobalt and iron with amino-alcohol ligands in alkaline electrolytes in accordance with an embodiment of the present invention.
Figure 3:
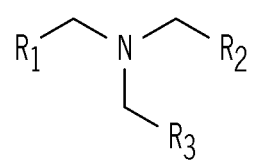
FIG. 3 illustrates the structural backbone of the various amino-alcohol ligands that may be used with first row transition metals to form the electroactive species in accordance with an embodiment of the present invention.
Figure 3:
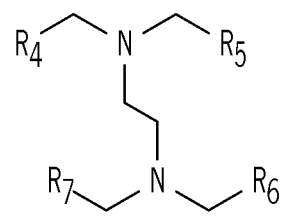
Figure 4:
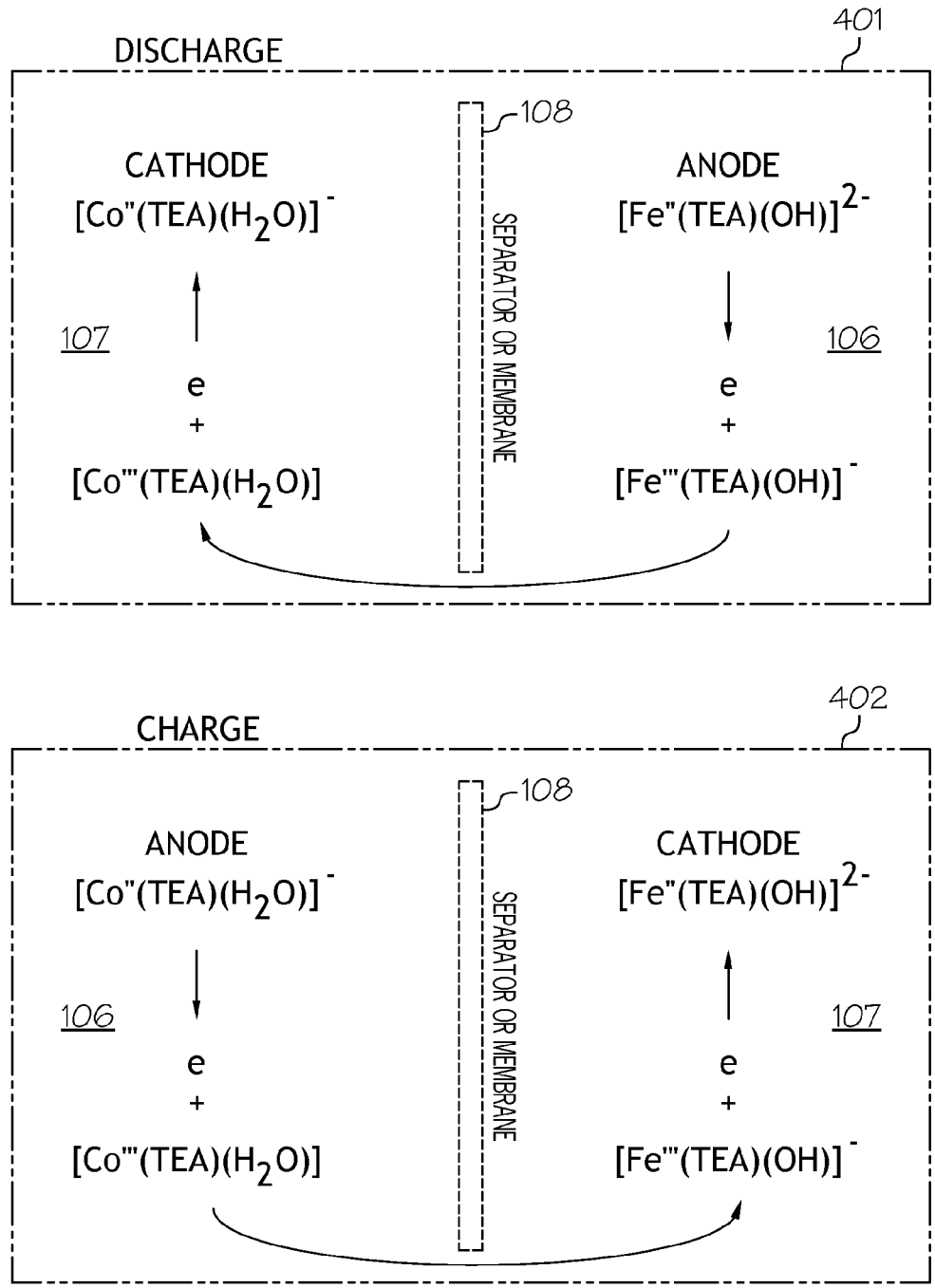
FIG. 4 illustrates the chemical reactions that occur at the anode and the cathode during the charging and discharging cycles of the redox flow battery in accordance with an embodiment of the present invention.
Figure 5:
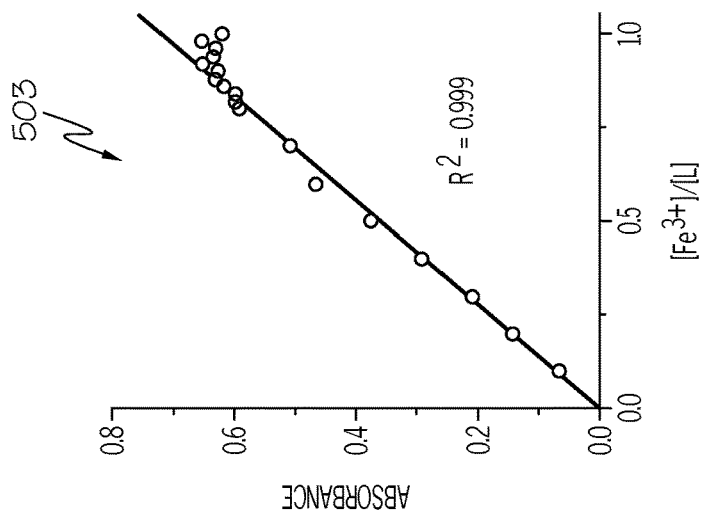
FIG. 5 illustrates that the stability of the redox flow battery of the present invention, as measured by the stability constant of the complexes formed, such as the iron complex, is quite high, thereby inferring that the active components of the redox flow battery will stay in solution, provide a good shelf life, and not decompose due to electron transfer reactions, in accordance with an embodiment of the present invention.
Figure 5:
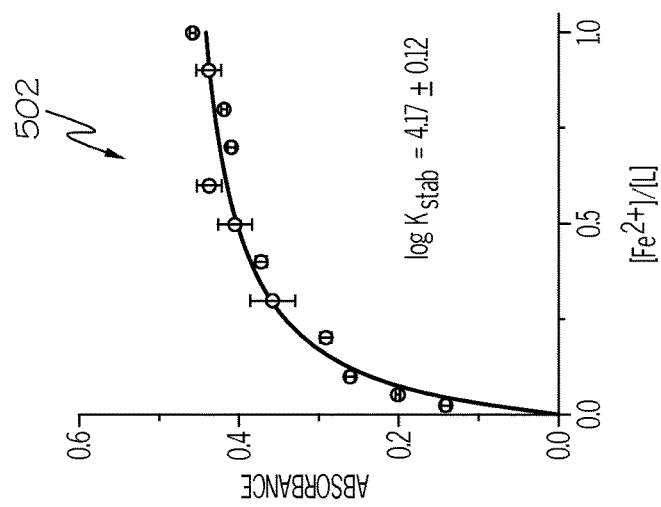
Figure 5:
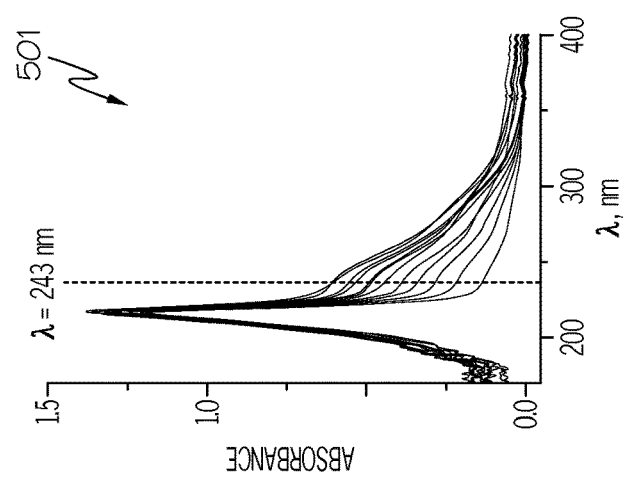
Figure 6B:
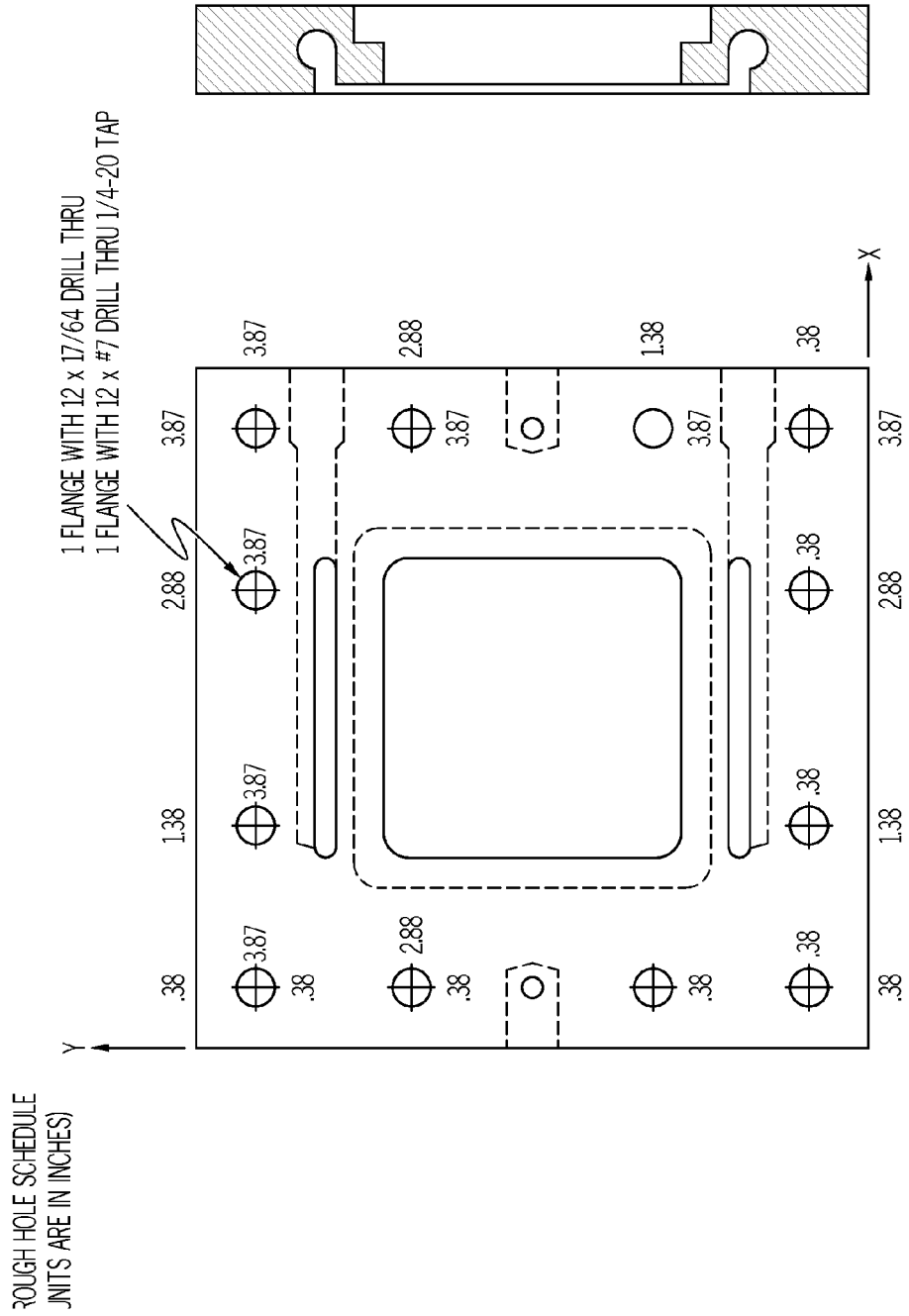
FIG. 6B illustrates the through hole schedule of the flow battery flange in accordance with an embodiment of the present invention.
Figure 6C:
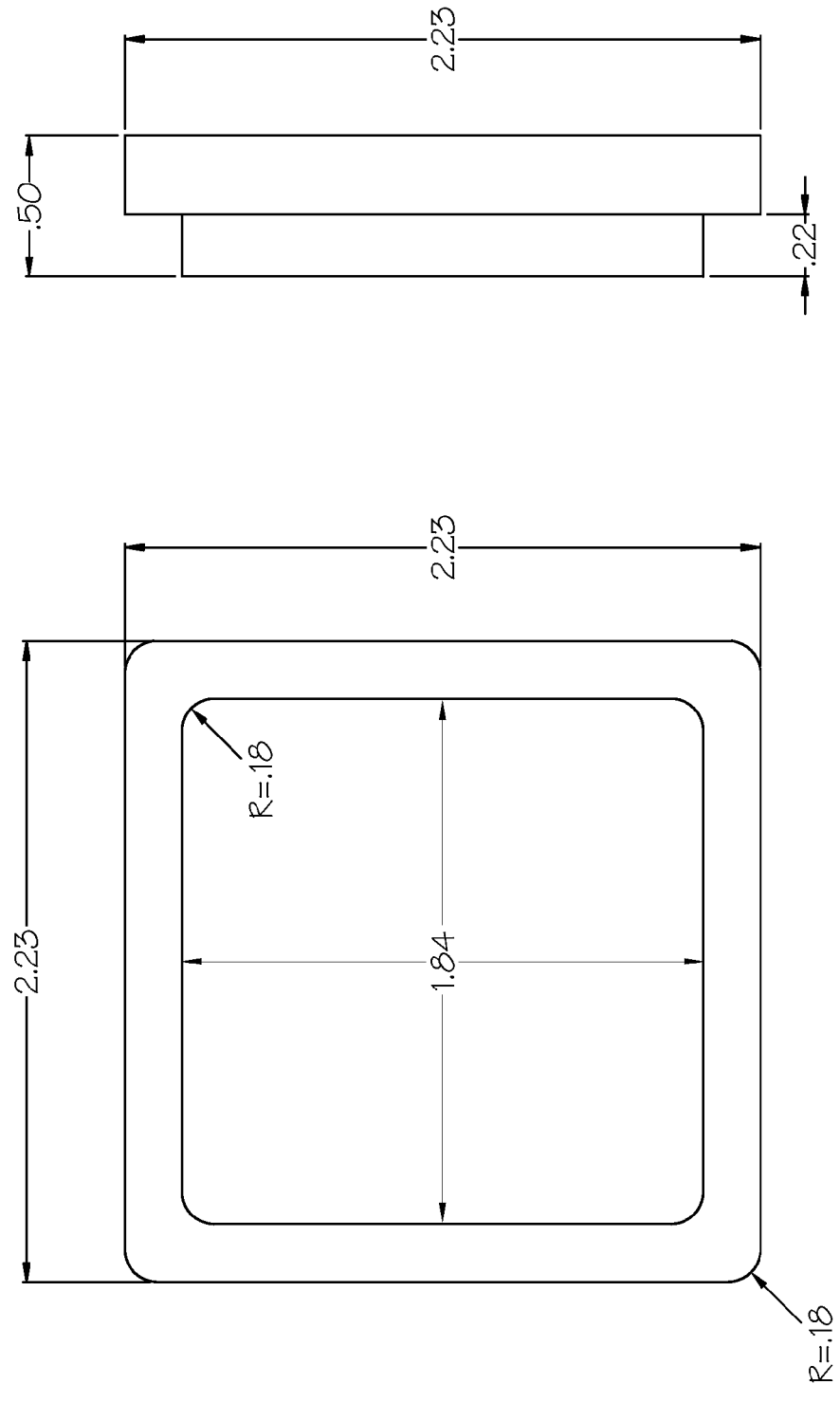
FIG. 6C illustrates the current collectors of the redox flow battery in accordance with an embodiment of the present invention.
Figure 7:
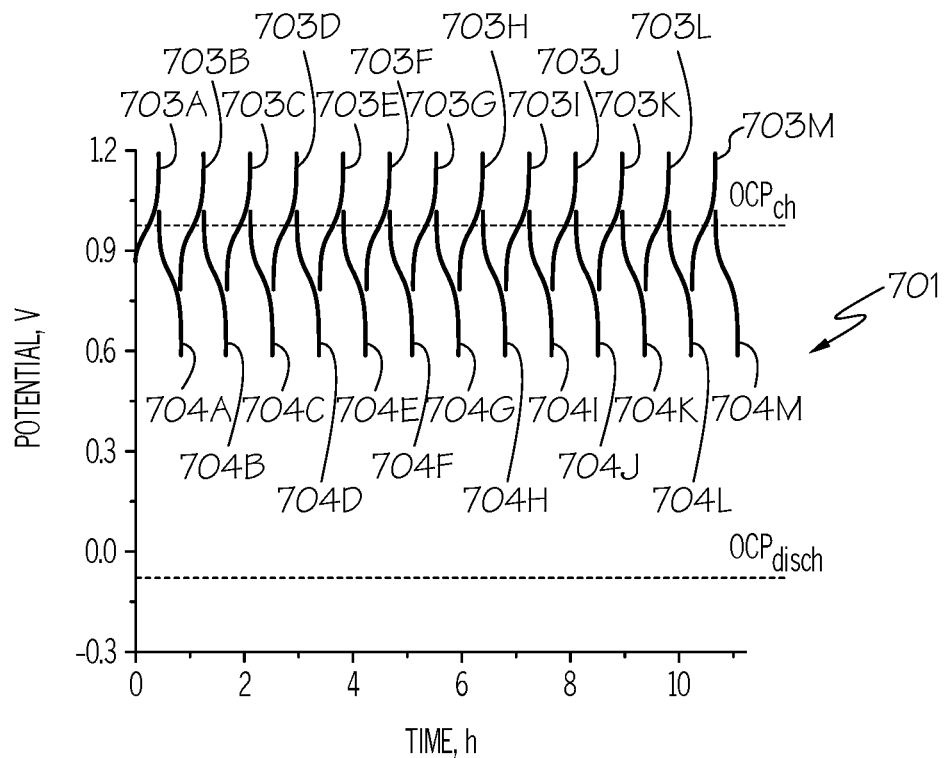
FIG. 7 depicts graphs illustrating the voltage and coulombic efficiency of the redox flow battery of FIG. 1 in accordance with an embodiment of the present invention.
Figure 7:
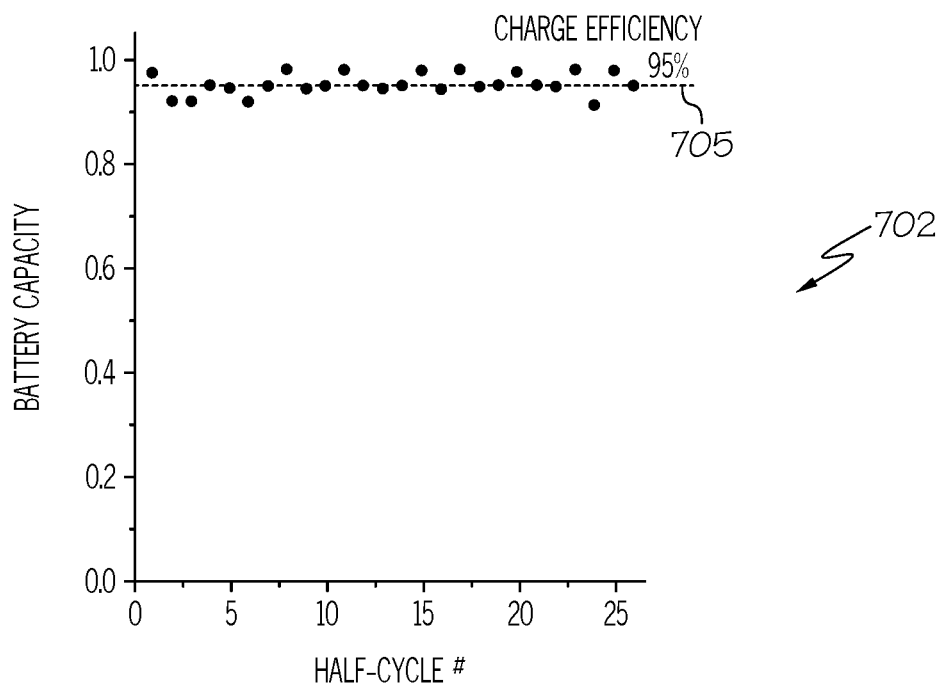

The principles of the present invention provide a means for developing a redox flow battery that uses complexes of transition metals, e.g., cobalt and iron, with amino-alcohol ligands as the electroactive species in alkaline electrolytes to store electrical energy as discussed further below in connection with FIGS. 1-5, 6A-6C and 7. FIG. 1 illustrates a redox flow battery system incorporating a redox flow battery that uses complexes of cobalt and iron with amino-alcohol ligands as the electroactive species in alkaline electrolytes for storing electrical energy. FIG. 2 is a flowchart of a method for forming the complexes of cobalt and iron with amino-alcohol ligands in alkaline electrolytes. FIG. 3 illustrates the structural backbone of the various amino-alcohol ligands that may be used with transition metals to form the electroactive species. FIG. 4 illustrates the chemical reactions that occur at the anode and the cathode during the charging and discharging cycles of the redox flow battery. FIG. 5 illustrates that the stability of the redox flow battery of the present invention, as measured by the stability constant of the complexes formed, such as the iron complex, is quite high, thereby inferring that the active components of the redox flow battery will stay in solution, provide a good shelf life, and not decompose due to electron transfer reactions. FIG. 6A illustrates the redox flow battery flange. FIG. 6B illustrates the through hole schedule of the flow battery flange FIG. 6C illustrates the current collectors of the redox flow battery. FIG. 7 depicts graphs illustrating the voltage and coulombic efficiency of the redox flow battery of FIG. 1.

By using an alkaline electrolyte, as opposed to an acidic electrolyte, the alkaline electrolyte is less reactive (corrosive) to the cell components, including the separator or ion-exchange membrane, and does not substantially compromise the conductivity. As a result, the operational and maintenance costs of the redox flow battery are reduced. Furthermore, the chemical stability of the system (measured by the stability constant of the complexes formed and the rate of any decomposition reactions) offers good shelf life of the active components (that is, the active components of the redox flow battery will stay in solution, provide a good shelf life, and not decompose due to electron transfer reactions), thereby providing a considerable decrease in maintenance costs. Furthermore, as discussed further below, the preparation of the redox species in the redox flow battery of the present invention is carried out in a one-step, straightforward process that is better than the complex manufacturing process of other competitive electrolytes. Additionally, a limited amount of loss in capacity occurs during the charging/discharging cycles as discussed further below.

Referring now to the Figures in detail, FIG. 1 illustrates a redox flow battery system 100 in accordance with an embodiment of the present invention. Redox flow battery system 100 includes a redox flow battery 101 that uses complexes of cobalt and iron with amino-alcohol ligands as the electroactive species in the alkaline electrolytes to store electrical energy from power sources 102 (e.g., wind, solar power, generator) optionally via an AC/DC converter 103 during the charging cycle to be later used by customers 104 via AC/DC converter 103 during the discharging cycle in accordance with an embodiment of the present invention.

Redox flow battery 101 includes an electrochemical cell 105, such as a battery cell as shown in FIG. 1, that includes a high surface area electrode functioning as the anode 106 and a high surface area electrode functioning as the cathode 107. Each electrode 106, 107 of battery cell 105 may be referred to as a "half-cell" of battery cell 105.

Battery cell 105 further includes a separator 108 separating anode 106 and cathode 107, where a flow of ionic current occurs through separator 108. In one embodiment, an ion-exchange membrane serves as separator 108, which is used to prevent mixing or crossover of the electroactive species, which would result in the chemical short-circuit of the electroactive materials. Ideally, among charged species, only the common counter ion carrier is allowed to cross separator 108. An ion-exchange membrane may be used as separator 108, such as shown in FIG. 1, to preferentially reject ions with the same sign of charge as the membrane's fixed ion sites.

Redox flow battery 101 further includes electrolyte storage units 109, 110, where electrolyte storage unit 109 provides the electrolytes for anode 106 and electrolyte storage unit 110 provides the electrolytes for cathode 107. In one embodiment, as will be discussed in further detail below, electrolyte storage units 109, 110 store complexes of cobalt and iron with amino-alcohol ligands as the electroactive species in alkaline electrolytes. For example, electrolyte storage unit 109 may store the complex of cobalt with an amino-alcohol ligand (e.g., triethanolamine) in the alkaline electrolyte (e.g., sodium hydroxide, potassium hydroxide). Electrolyte storage unit 110 may store the complex of iron with an amino-alcohol ligand (e.g., triethanolamine) in the alkaline electrolyte (e.g., sodium hydroxide, potassium hydroxide).

Additionally, redox flow battery 101 further includes pumps 111A-111B for circulating the electrolytes stored in storage units 109, 110, respectively, in a manner as shown by the arrows in FIG. 1. As a result, the electrolytes are circulated through the high surface area electrodes 106, 107 by pumps 111A-111B, respectively, to charge and discharge battery 101 through the valence change reaction of the metal ions serving as the active materials in the electrolytes of both electrodes 106, 107. During the discharging of redox flow battery 101, the reaction that occurs at anode 106 is

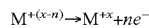

and the reaction that occurs at cathode 107 is

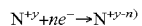

where M and N each represent metals, and where n, x and y each are non-negative integer numbers.

It is preferable to construct the redox flow battery in such a way as to minimize or prevent contact of the electrolytes with the outside environment, and in particular to avoid contact between the electrolyte and gases, such as the ambient atmosphere. This can be accomplished in a number of ways known in the art, for example, by blanketing with nitrogen or an inert gas. Carbon dioxide gas can readily absorb in an alkaline electrolyte, which would reduce performance by forming carbonates, complexing with amino-alcohols, and lowering the pH. Oxygen contact with some electrolytes, notably, for example, the iron complexes discussed below, can deactivate the redox species and lower efficiency.

In one embodiment, redox flow battery 101 uses complexes of transition metals, e.g., cobalt and iron, with amino-alcohol ligands as the electroactive species in the alkaline electrolytes (stored in storage units 109, 110) to store electrical energy, where the complexes of cobalt and iron with amino-alcohol ligands in the alkaline electrolytes are formed using the process of FIG. 2.

FIG. 2 is a flowchart of a method 200 for forming the complexes of cobalt and iron with amino-alcohol ligands in alkaline electrolytes in accordance with an embodiment of the present invention.

Referring to FIG. 2, in conjunction with FIG. 1, in step 201, stoichiometric amounts of a first metal ion, such as cobalt, are mixed with an amino-alcohol ligand, such as triethanolamine, in water at a pH of about 7, to form a metal-ligand mixture. In step 202, stoichiometric amounts of a second metal ion, such as iron, are mixed with an amino-alcohol ligand, such as triethanolamine, in water at a pH of about 7, to form a second metal-ligand mixture. The amino-alcohol ligand used in step 202 may be the same or may be different from the amino-alcohol ligand used in step 201. Examples of an amino-alcohol that can be used in steps 201, 202 include triethanolamine; 1-[Bis(2-hydroxyethyl) amino]-2-propanol; triisopropanolamine; 1,1'-[(2-hydroxyethyl)imino]bis-2-propanol; N,N-bis(2-hydroxyethyl)-Glycine; 2-[bis(2-hydroxyethyl)amino]-2-(hydroxymethyl)-1,3-propanediol; 3-[bis(2-hydroxyethyl)amino]-2-hydroxy-1-propanesulfonic acid; 2,2',2'',2'''-(1,2-ethanediyldinitrilo) tetrakis-ethanol, and all other ligands with the general formula: N(CR1R2CR3R4-OR5), where R1, R2, R3, R4 and R5 can be any functional group, organic, organometallic or inorganic substituent.

While the description herein discusses redox flow battery 101 using complexes of cobalt and iron with amino-alcohol ligands as the electroactive species, other transition metals, and preferably the other first-row transition metals (e.g., scandium, titanium, vanadium, chromium, manganese, nickel, copper and zinc) may be used with various amino-alcohol ligands containing the structural backbone shown in FIG. 3 in accordance with an embodiment of the present invention.

FIG. 3 illustrates the structural backbone of the various amino-alcohol ligands that may be used with first-row transition metals to form the electroactive species in accordance with an embodiment of the present invention.

Referring to FIG. 3, functional groups R1-R7 may all be the same or all be different from one another and may include all possible combinations of the groups depicted in the scheme shown in FIG. 3, where each of the functional groups R1-R7=COOH, $CH_2OH$, $CH_2OHCH_3$, aliphatic, aromatic, etoxy, carboxyl, sulfonic, phosphorous, alcohol, amino, organometallic or inorganic, and where N represents nitrogen.

Returning to FIG. 2, in conjunction with FIGS. 1 and 3, in step 203, an alkaline electrolyte, such as sodium hydroxide pellets, are pre-dissolved in water to form a solution.

In step 204, the solution of step 203 is cooled to room temperature.

In step 205, an amount corresponding to 3-5 moles/liter of the alkaline electrolyte solution of step 204, is added to the metal-ligand mixture formed in step 201 to form a metal complex of cobalt with the amino alcohol ligand (e.g., triethanolamine) in the alkaline electrolyte. The metal complex of cobalt with the amino alcohol ligand (e.g., triethanolamine) represents the electroactive species in the alkaline electrolyte which may be stored in an electrolyte storage unit, such as storage unit 109.

In step 206, an amount corresponding to 3-5 moles/liter of the alkaline electrolyte solution of step 204, is added to the metal-ligand mixture formed in step 202 to form a metal complex of iron with the amino alcohol ligand (e.g., triethanolamine) in the alkaline electrolyte. The metal complex of iron with the amino alcohol ligand (e.g., triethanolamine) represents the electroactive species in the alkaline electrolyte, which may be stored in an electrolyte storage unit, such as storage unit 110.

In one embodiment, the metal complexes, such as cobalt and iron complexes, with the amino alcohols are formed spontaneously (with vigorous stirring), such as within 1-20 minutes depending on the concentration of the species. For example, cobalt and iron complexes with 1-[Bis(2-hydroxyethyl)amino]-2-propanol give two reversible redox processes at −0.05 V and −1.05 V (versus Ag/AgCl) respectively, offering a net output voltage for redox flow battery 101 of 1.00 V.

As discussed above, once the electroactive species in the alkaline electrolytes are stored in storage units 109, 110, the chemical reaction that occurs during discharge at anode 106 is:

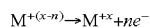

and the reaction that occurs at cathode 107 is:

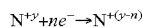

where M and N each represent metals, and where n, x and y each are non-negative integer numbers. In connection with using the metal complexes of cobalt and iron with amino alcohol ligands as the electroactive species in the alkaline electrolytes, FIG. 4 illustrates the chemical reactions that occur at anode 106 and cathode 107 during the charging and discharging cycles of redox flow battery 101 in accordance with an embodiment of the present invention.

Referring to FIG. 4, FIG. 4 illustrates the electroactive species being metal complexes of cobalt and iron with the amino alcohol ligand of triethanolamine (TEA). During the discharge cycle 401, oxidation occurs at anode 106 where an electron is lost such that $[Fe^{II}(TEA)(OH)]^{2-} \rightarrow [Fe^{III}(TEA)(OH)]^{-}$ and reduction occurs at cathode 107 where an electron is gained such that $[Co^{III}(TEA)(H_2O)] \rightarrow [Co^{II}(TEA)(H_2O)]^{-}$. During the charge cycle 402, oxidation occurs at anode 106 where an electron is lost such that $[Co^{II}(TEA)(H_2O)]^{-} \rightarrow [Co^{III}(TEA)(H_2O)]$ and reduction occurs at cathode 107 where an electron is gained such that $[Fe^{III}(TEA)(OH)]^{-} \rightarrow [Fe^{II}(TEA)(OH)]^{2-}$.

A prototype of redox flow battery 101 using method 200 to form the electroactive species in the alkaline electrolytes was built and tested. Some of the results include no evolution of gas during either charging or discharging, nor dendrite growth or other phase changes or parasitic reactions during battery cycling. Furthermore, the electroactive species (e.g., cobalt/iron mixed with an amino-alcohol ligand) are negatively charged and electrostatically repelled from sulfonated ion-exchange membrane 108, such as Nafion®, thereby preventing the species from crossing membrane 108 over to the other half-cell and causing appreciable discharge reactions in redox flow battery 101 during cycling. Cyclability has been tested up to 25 cycles over 1.5 days using a 50 μm thick Nafion® membrane 108 and a current density of 10 mA/cm² with only a 3% loss in capacity. By using such a thin membrane 108, crossover of the species is diminished and the cost in fabricating such a redox flow battery is reduced.

In some implementations, method 200 may include other and/or additional steps that, for clarity, are not depicted. Further, in some implementations, method 200 may be executed in a different order presented and that the order presented in the discussion of FIG. 2 is illustrative. Additionally, in some implementations, certain steps in method 200 may be executed in a substantially simultaneous manner or may be omitted.

As discussed above, the chemical stability of the redox flow battery 101 (measured by the stability constant of the complexes formed and the rate of any decomposition reactions) offers good shelf life of the active components (that is, the active components of the redox flow battery will stay in solution, provide a good shelf life, and not decompose due to electron transfer reactions), thereby providing a considerable decrease in maintenance costs. FIG. 5 illustrates that the stability of redox flow battery 101 as measured by the stability constant of the complexes formed, such as the iron complex, is quite high, thereby inferring a good shelf life of the active components (that is, the active components of the redox flow battery will stay in solution, provide a good shelf life, and not decompose due to electron transfer reactions) of redox flow battery 101 in accordance with an embodiment of the present invention.

Referring to FIG. 5, FIG. 5 includes a graph 501 illustrating the absorbance versus the wavelength in nanometers, at different concentrations of the complex between iron and triethanolamine (amino-alcohol ligand), where the maximum absorbance is observed at λ=243 nanometers. FIG. 5 further includes graphs 502 and 503, illustrating the maximum absorbance at λ=243 for the complexes of iron(II) and iron(III) with triethanolamine in 5 moles/liter of sodium hydroxide (alkaline electrolyte), respectively. In determining the stability constant ($k_{stab}$), the absorbance (y-axis) of the complexes of iron(II) and iron(III) with triethanolamine was studied as a function of the concentration of iron ions, while keeping the concentration of triethanolamine constant (x-axis). The behavior observed in graph 502 can be simulated from theory by the use of the equation:

$$\text{Abs.} = \frac{\varepsilon l K_{stab}[L]_T[\text{Fe(OH)}_2]}{[\text{OH}^-] + K_{stab}[\text{Fe(OH)}_2]}$$

where $\varepsilon$ is the molar absorptivity coefficient, l is the pathlength of the experimental quartz cuvette, $K_{stab}$ is the stability constant, $[\text{Fe(OH)}_2]$ is the concentration of iron added, and $[\text{OH}^-]$ is the concentration of the alkaline electrolyte, 5 M in graphs 502 and 503. A mathematical fit of the experimental data with the equation above gives for iron(II) the value $K_{stab}=14{,}791$. The solubility of iron(II) in 5 M alkaline electrolyte is $s=1.9\times10^{-18}$ moles/liter. The stability constant obtained for iron(II) with triethanolamine is $K_{stab}>>>s$. This result indicates that iron(II) prefers to form a complex with triethanolamine and stay in solution by a factor $\approx 10^{20}$ times larger than the precipitation equilibrium to form the insoluble $\text{Fe(OH)}_2$. Further, the behavior observed in graph 503 can be simulated from theory by the use of the equation:

$$\text{Abs.}=\varepsilon l[\text{Fe(TEA)(OH)}]^-$$

where $\varepsilon$ is the molar absorptivity coefficient, l is the pathlength of the experimental quartz cuvette, and $[\text{Fe(TEA)(OH)}]^-$ is the concentration of the complex. This equation indicates that the binding constant $K_{stab}$ for iron(III) is so large that it cannot be measured by the spectrophotometric approach ($K_{stab}$ is not included in the equation). By a different method not described herein for simplicity, the stability constant for iron(III) with TEA can be obtained and the value is $K_{stab}=38{,}018{,}939$. The solubility of iron(III) in 5 M alkaline electrolyte is $s=2.2\times10^{-41}$ moles/liter. The stability constant obtained for iron(III) with triethanolamine is $K_{stab}>>>S$. This result indicates that iron(III) prefers to form a complex with triethanolamine and stay in solution by a factor $\approx 10^{48}$ times larger than the precipitation equilibrium to form the insoluble $\text{Fe(OH)}_3$.

An example demonstrating the cycling and cycling stability of redox flow battery 101 (FIG. 1) of the present invention is discussed below in connection with FIGS. 1, 4, 6A-6C and 7. FIG. 6A illustrates the redox flow battery flange in accordance with an embodiment of the present invention. FIG. 6B illustrates the through hole schedule of the flow battery flange in accordance with an embodiment of the present invention. FIG. 6C illustrates the current collectors of the redox flow battery in accordance with an embodiment of the present invention. FIG. 7 depicts graphs 701, 702 illustrating the voltage and coulombic efficiency, respectively, of redox flow battery 101 of FIG. 1 in accordance with an embodiment of the present invention.

Example

A cobalt complex solution, of cobalt complexed with 1-[bis(2-hydroxyethyl)amino]-2-propanol (mTEA), was prepared as follows. A first electrolyte solution was prepared from a known amount ($2.5\times10^{-3}$ moles, or 0.595 g) of cobaltous chloride hexahydrate ($\text{CoCl}_2 \cdot 6\text{H}_2\text{O}$, molecular weight 237.93 g mol$^{-1}$) dissolved in a known amount of distilled water (15 mL). An amount of mTEA ($\text{C}_7\text{H}_{17}\text{NO}_3$, molecular weight 163.21 g mol$^{-1}$, specific gravity 1.079) selected to achieve a 1:1 molar ratio with cobalt ($2.5\times10^{-3}$ moles, or 0.378 mL) was added to this solution while stirring vigorously. A change of color and viscosity of the solution was observed upon the addition of the ligand. The solution was stirred to homogenize for 3 minutes, forming said first electrolyte solution. A second electrolyte solution, of concentrated sodium hydroxide (NaOH, molecular weight 39.99 g mol$^{-1}$), was prepared by dissolving 8 g (0.2 moles) of NaOH in 15 mL of distilled water with vigorous stirring and cooling to room temperature. Next, the entire portion of the second electrolyte solution was added dropwise to said first electrolyte solution, while stirring. Complexation occurred immediately, first forming a dense viscous mass that subsequently dissolved to give a clear, dark purple solution within 10 minutes. The solution was then diluted to an overall volume of 50 mL, to obtain a 0.05 M cobalt complex solution in 4.0 M NaOH.

In a closed flask, under an inert atmosphere at all times (in the present example, an argon atmosphere), an iron complex solution, of iron complexed with triethanolamine (TEA), was prepared as follows. A third electrolyte solution was prepared from a known amount ($5.5\times10^{-3}$ moles, or 1.093 g) of ferrous chloride tetrahydrate ($\text{FeCl}_2 \cdot 4\text{H}_2\text{O}$, molecular weight 198.81 g mol$^{-1}$) dissolved in a known amount of distilled water (15 mL). An amount of TEA ($\text{C}_6\text{H}_{15}\text{NO}_3$, molecular weight 149.19 g mol$^{-1}$, specific gravity 1.124) selected to achieve a 2:1 molar ratio with iron ($1.1\times10^{-2}$ moles, or 1.460 mL) was added to this solution while stirring vigorously. A change of color and viscosity of the solution was observed upon addition of the ligand. The solution was stirred to homogenize for 3 minutes, forming said third electrolyte solution. A fourth electrolyte solution, of concentrated sodium hydroxide (NaOH, molecular weight 39.99 g mol$^{-1}$), was prepared by dissolving 8 g (0.2 moles) of NaOH in 15 mL of distilled water with vigorous stirring and cooling to room temperature. Next, the entire portion of the fourth electrolyte solution was added dropwise to said third electrolyte solution, while stirring. Complexation occurred immediately, first forming a dense viscous mass that subsequently dissolved to give a clear, green solution within 15 minutes. The solution was then diluted to an overall volume of 50 mL, to obtain a 0.11 M iron complex solution in 4 M NaOH.

The cycling performance of a redox flow battery according to FIG. 4, and using said cobalt complex solution and said iron complex solution, was evaluated in a flow-through cell design as illustrated in FIGS. 6A-6C. The cell flanges were machined from two blocks (10.8×10.8 cm, by 1.3 cm thick) of Delrin® polymer (ePlastics®) as illustrated in FIG. 6A. The cell had porous carbon felt (e.g., Sigracell® GFD 5 from SGL Group) as the electrodes (45×45 mm, by 5 mm thick) and a 50-µm thick Nafion® film (Nafion® 112) as the ion-exchange membrane (e.g., membrane 108 of FIG. 1). The through hole schedule of the flow battery flange is shown in FIG. 6B. The current collectors were machined as illustrated in FIG. 6C from Tokai graphite (Glemco). Further, two steel end plates were used to hold the cell components together, by placing the end plates next to each flange and screwing them together. The assembled cell has a sandwich structure, with the end plates on the outside, between them the cell flanges of FIG. 6A-6B, between those the current collectors of FIG. 6C. Inside those layers, each porous electrode (e.g., anode 106, cathode 107 of FIG. 1) is captured and partially compressed in the space between its current collector and the membrane (e.g., membrane 108 of FIG. 1), said membrane being the middle layer of the assembled cell. Suitable gasket materials or o-ring seals may be used to seal the flow path of the electrolytes through the cell, and to avoid ingress of atmospheric gases. Electrical connection is made to the current collectors. Each electrolyte was continually recirculated from its storage container (e.g., storage units 109, 110 of FIG. 1) to the porous electrode (e.g., anode 106, cathode 107 of FIG. 1) of the cell (e.g., battery cell 105 of FIG. 1) as the system was charged or discharged. The flow rate of each electrolyte was set to 0.8 mL s$^{-1}$ with a peristaltic pump, and the cell current was maintained to provide a constant average current density of ±10 mA/cm$^2$ during cycling. Both electrolyte storage containers (e.g., storage units 109, 110) were kept under argon atmosphere at all times and the humidity of the system was controlled via a water trap. Norprene-covered glass tubing was used to prevent oxygen from leaking into the flow lines. Charging and discharging was carried out between 0% and 100% state-of-charge to evaluate the coulombic efficiency of the system over time. The state-of-charge (SOC) was determined as the ratio of coulombs obtained during charge over the theoretical number of coulombs given at a specific concentration of cobalt electrolyte:

$$SOC = \frac{\#C_{ch.}}{\#C_{theo.}} \cdot 100$$

$$\#C_{theo.} = [Co] \cdot V \cdot F$$

where [Co] is the concentration of cobalt in solution, V is the volume and F is Faraday's constant. The current density was reversed, from charge to discharge, at SOC=100% when a cutoff voltage of 1.18 V was reached. Further, the current density was reversed, from discharge to charge, when a cutoff voltage of 0.60 V was reached.

FIG. 7 illustrates the battery performance data during charge-discharge cycling in accordance with an embodiment of the present invention. Referring to FIG. 7, graph 701 is a plot of voltage versus time, where the behavior of the battery voltage is studied at constant current density of ±10 mA/cm$^2$. Each line represents a different experiment: each line 703A-703M represents a new charge half-cycle; whereas, each line 704A-704M represents a new discharge half-cycle. Overall, the behavior of the battery is constant in the 13 cycles shown. The voltage of the battery was −0.1 V when discharged and 1.01 V when charged. From graph 701, the voltage efficiency can be calculated as:

$$V_{eff} = \frac{V_{disch.}}{V_{ch.}} \cdot 100 = 87\%$$

where $V_{disch.}$ is the average voltage of the battery during discharge and $V_{ch.}$ is the average voltage of the battery during charge. Furthermore, graph 702 illustrates a plot of battery capacity versus half-cycle. The battery capacity is taken as:

$$Capacity = \frac{\#C_{half-cycle}}{\#C_{theo.}} = 0.98$$

where $C_{half-cycle}$ is the number of coulombs obtained at the end of every half-cycle. Line 705 in graph 702 shows the average charge efficiency. The charge efficiency is defined as:

$$Ch.Eff. = \frac{\#C_{disch.}}{\#C_{ch.}} \cdot 100 = 95\%$$

where $\#C_{disch.}$ is the number of coulombs obtained during discharge and $\#C_{ch.}$ is the number of coulombs obtained during charge.

In regard to FIG. 7, the performance of the redox flow battery of FIG. 1 containing cobalt and iron complexes in alkaline electrolyte was evaluated. Excellent stability during battery cycling was observed in 13 cycles, with no change in battery capacity. Further, the number of coulombs obtained in every half-cycle matches well with the value predicted from theory, indicating that no parasitic reactions (e.g., decomposition, evolution of gas) occur during cycling. Further, no crossover was observed in 9 hours of constant cycling, according to an average battery capacity of 0.98 in 13 cycles.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A redox flow battery, comprising:
a first electrolyte storage, wherein said first electrolyte storage comprises a first metal complex selected from a first-row of transition metal ions with a first amino-alcohol ligand as an electroactive species in an alkaline electrolyte;
a second electrolyte storage, wherein said second electrolyte storage comprises a second metal complex selected from said first-row of transition metal ions with a second amino-alcohol ligand as an electroactive species in said alkaline electrolyte;
an electrochemical cell connected to said first and second electrolyte storages, wherein said electrochemical cell comprises a first half-cell and a second half-cell, wherein said first half-cell comprises a first high surface area electrode functioning as an anode, wherein said second half-cell comprises a second high surface area electrode functioning as a cathode, wherein said first and second half-cells are separated from each other by an ion exchange membrane; and
a first and a second pump for circulating said electrolytes in said first and second electrolyte storages, respectively, in said anode and said cathode, respectively.

2. The redox flow battery as recited in claim 1, wherein each of said first and said second amino-alcohol ligands comprises one of the following: triethanolamine; 1-[Bis(2-hydroxyethyl)amino]-2-propanol; triisopropanolamine; 1,1'-[(2-hydroxyethyl)imino]bis-2-propanol; N,N-bis(2-hydroxyethyl)-Glycine; 2-[bis(2-hydroxyethyl)amino]-2-(hydroxymethyl)-1,3-propanediol; 3-[bis(2-hydroxyethyl)amino]-2-hydroxy-1-propanesulfonic acid; 2,2',2",2"'-(1,2-ethanediyldinitrilo)tetrakis-ethanol, and all other ligands with a general formula: N(CR1R2CR3R4-OR5), where R1, R2, R3, R4 and R5 is a functional group, organic, organometallic or inorganic substituent.

3. The redox flow battery as recited in claim 1, wherein said first metal complex comprises cobalt and said second metal complex comprises iron.

4. The redox flow battery as recited in claim 1, wherein said alkaline electrolyte comprises sodium hydroxide.

5. The redox flow battery as recited in claim 1, wherein said alkaline electrolyte comprises potassium hydroxide.

6. The redox flow battery as recited in claim 1, wherein said first and said second amino alcohol ligands contain a structural backbone shown below:

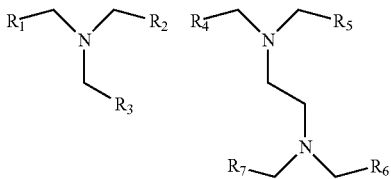

wherein functional group R1=R2=R3=R4=R5=R6=R7, wherein said functional group R1=COOH, CH$_2$OH, CH$_2$OHCH$_3$, aliphatic, aromatic, etoxy, carboxyl, sulfonic, phosphorous, alcohol, amino, organometallic or inorganic, and wherein N represents nitrogen.

7. The redox flow battery as recited in claim 1, wherein said first and said second amino alcohol ligands contain a structure backbone shown below:

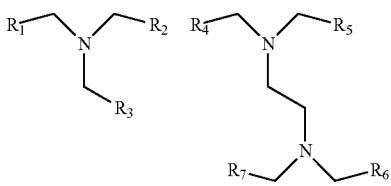

wherein functional group R1≠R2≠R3≠R4≠R5≠R6≠R7, wherein each of said functional groups R1, R2, R3, R4, R5, R6 and R7=COOH, CH$_2$OH, CH$_2$OHCH$_3$, aliphatic, aromatic, etoxy, carboxyl, sulfonic, phosphorous, alcohol, amino, organometallic or inorganic, and wherein N represents nitrogen.

8. A redox flow battery system, comprising:
one or more power sources; and
a redox flow battery connected to said one or more power sources via an AC/DC converter, wherein said redox flow battery is configured to store electrical energy from said one or more power sources via said AC/DC converter, wherein said redox flow battery comprises:
a first electrolyte storage, wherein said first electrolyte storage comprises a first metal complex selected from a first-row of transition metal ions with a first amino-alcohol ligand as an electroactive species in an alkaline electrolyte;
a second electrolyte storage, wherein said second electrolyte storage comprises a second metal complex selected from said first-row of transition metal ions with a second amino-alcohol ligand as an electroactive species in said alkaline electrolyte;
an electrochemical cell connected to said first and second electrolyte storages, wherein said electrochemical cell comprises a first half-cell and a second half-cell, wherein said first half-cell comprises a first high surface area electrode functioning as an anode, wherein said second half-cell comprises a second high surface area electrode functioning as a cathode, wherein said first and second half-cells are separated from each other by an ion exchange membrane; and
a first and a second pump for circulating said electrolytes in said first and second electrolyte storages, respectively, in said anode and said cathode, respectively.

9. The redox flow battery system as recited in claim 8, wherein each of said first and said second amino-alcohol ligands comprises one of the following: triethanolamine; 1-[Bis(2-hydroxyethyl)amino]-2-propanol; triisopropanolamine; 1,1'-[(2-hydroxyethyl)imino]bis-2-propanol; N,N-bis(2-hydroxyethyl)-Glycine; 2-[bis(2-hydroxyethyl)amino]-2-(hydroxymethyl)-1,3-propanediol; 3-[bis(2-hydroxyethyl)amino]-2-hydroxy-1-propanesulfonic acid; 2,2',2'',2'''-(1,2-ethanediyldinitrilo)tetrakis-ethanol, and all other ligands with a general formula: N(CR1R2CR3R4-OR5), where R1, R2, R3, R4 and R5 is a functional group, organic, organometallic or inorganic substituent.

10. The redox flow battery system as recited in claim 8, wherein said first metal complex comprises cobalt and said second metal complex comprises iron.

11. The redox flow battery system as recited in claim 8, wherein said alkaline electrolyte comprises sodium hydroxide.

12. The redox flow battery system as recited in claim 8, wherein said alkaline electrolyte comprises potassium hydroxide.

13. The redox flow battery system as recited in claim 8, wherein said first and said second amino alcohol ligands contain a structural backbone shown below:

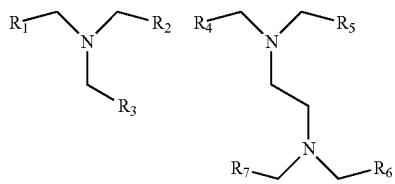

wherein functional group R1=R2=R3=R4=R5=R6=R7, wherein said functional group R1=COOH, CH$_2$OH, CH$_2$OHCH$_3$, aliphatic, aromatic, etoxy, carboxyl, sulfonic, phosphorous, alcohol, amino, organometallic or inorganic, and wherein N represents nitrogen.

14. The redox flow battery system as recited in claim 8, wherein said first and said second amino alcohol ligands contain a structural backbone shown below:

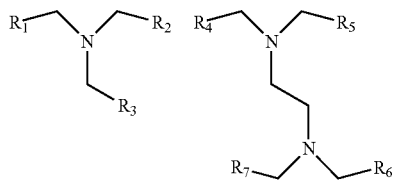

wherein functional group R1≠R2≠R3≠R4≠R5≠R6≠R7, wherein each of said functional groups R1, R2, R3, R4, R5, R6 and R7=COOH, CH$_2$OH, CH$_2$OHCH$_3$, aliphatic, aromatic, etoxy, carboxyl, sulfonic, phosphorous, alcohol, amino, organometallic or inorganic, and wherein N represents nitrogen.

* * * * *